United States Patent
Nagasawa

(10) Patent No.: US 10,737,648 B2
(45) Date of Patent: Aug. 11, 2020

(54) AIRBAG APPARATUS

(71) Applicant: SUBARU CORPORATION, Tokyo (JP)

(72) Inventor: Isamu Nagasawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 119 days.

(21) Appl. No.: 15/943,001

(22) Filed: Apr. 2, 2018

(65) Prior Publication Data

US 2018/0304844 A1 Oct. 25, 2018

(30) Foreign Application Priority Data

Apr. 20, 2017 (JP) ................. 2017-083530

(51) Int. Cl.
| | |
|---|---|
| *B60R 21/0132* | (2006.01) |
| *B60R 21/203* | (2006.01) |
| *B60R 21/2338* | (2011.01) |
| *B60R 21/015* | (2006.01) |
| *B60R 21/013* | (2006.01) |

(52) U.S. Cl.
CPC .... *B60R 21/0132* (2013.01); *B60R 21/01512* (2014.10); *B60R 21/01552* (2014.10); *B60R 21/01554* (2014.10); *B60R 21/203* (2013.01); *B60R 21/2338* (2013.01); *B60R 2021/01313* (2013.01); *B60R 2021/23382* (2013.01); *B60R 2021/23384* (2013.01)

(58) Field of Classification Search
CPC .......... B60R 21/0132; B60R 21/01554; B60R 21/01552; B60R 21/01512; B60R 21/2338; B60R 21/203; B60R 2021/23382; B60R 2021/23384; B60R 2021/01313; B60R 2021/23386
See application file for complete search history.

(56) References Cited

U.S. PATENT DOCUMENTS

| | | | | |
|---|---|---|---|---|
| 5,295,712 | A | * 3/1994 | Omura | .................. B60R 21/203 280/731 |
| 6,170,862 | B1 | * 1/2001 | Hoagland | ........... B60R 21/2032 280/731 |
| 9,108,584 | B2 | * 8/2015 | Rao | ........................ B60R 21/017 |
| 9,452,725 | B2 | * 9/2016 | Lorenz | ................ B60R 21/0134 |
| 9,994,178 | B2 | * 6/2018 | Paxton | .................... F15B 15/19 |

(Continued)

FOREIGN PATENT DOCUMENTS

| | | |
|---|---|---|
| JP | 08-000520 B | 1/1996 |
| JP | 2008-044594 A | 2/2008 |
| JP | 2016-199123 A | 12/2016 |

OTHER PUBLICATIONS

Office Action received in Japanese Patent Application No. 2017-083530 dated Feb. 26, 2019 (3 pages in Japanese with English translation).

*Primary Examiner* — Drew J Brown
(74) *Attorney, Agent, or Firm* — Smith, Gambrell & Russell, LLP

(57) ABSTRACT

An airbag apparatus includes an airbag and an airbag controller. The airbag is disposed in a movable member and configured to be able to deploy in different sizes in a front-to-back direction of an automobile. The movable member can move in the front-to-back direction in front of a passenger in the automobile. The airbag controller is configured to control a size of the airbag to be deployed, according to a position to which the movable member is moved.

18 Claims, 6 Drawing Sheets

(56) References Cited

U.S. PATENT DOCUMENTS

| | | | | |
|---|---|---|---|---|
| 2002/0089160 A1* | 7/2002 | Mendis | ............... | B62D 1/181 |
| | | | | 280/777 |
| 2005/0283288 A1* | 12/2005 | Howell | ............... | B62D 1/18 |
| | | | | 701/41 |
| 2007/0046013 A1* | 3/2007 | Bito | ............... | B60R 21/203 |
| | | | | 280/777 |
| 2016/0375860 A1* | 12/2016 | Lubischer | ............... | B60R 21/203 |
| | | | | 74/493 |
| 2016/0375927 A1 | 12/2016 | Schulz et al. | | |
| 2017/0008475 A1* | 1/2017 | Kruse | ............... | B60R 21/0173 |

* cited by examiner

AIRBAG APPARATUS

CROSS-REFERENCE TO RELATED APPLICATIONS

The present application claims priority from Japanese Patent Application No. 2017-083530 filed on Apr. 20, 2017, the entire contents of which are hereby incorporated by reference.

BACKGROUND

1. Technical Field

The present invention relates to an airbag apparatus, and more specifically to an airbag apparatus including an airbag disposed in front of a passenger in an automobile.

2. Related Art

Conventionally, an airbag apparatus including an airbag disposed in front of a passenger in an automobile has been used to protect the passenger from an impact when the automobile is in a collision. For example, in order to protect the passenger sitting on the driver's seat, the airbag is disposed in a steering that steers the automobile. Upon a collision, this airbag is deployed to receive the passenger moving forward, and therefore can absorb an impact of the collision. However, when the distance between the airbag and the passenger is changed, for example, when the driver's seat is moved in the front-to-back direction, the deployment state of the airbag may not be optimum for receiving the passenger.

Therefore, as a technique to receive the passenger by the airbag optimally deployed, a vehicle passenger protection apparatus that controls a timing at which the airbag is actuated, depending on the tilt angle of the seat has been proposed, for example, in Japanese Examined Patent Application Publication (JP-A) No. H08-000520. This vehicle passenger protection apparatus is configured to accelerate the timing at which the airbag is actuated when the tilt angle of the seat is small, and to delay the timing at which the airbag is actuated when the tilt angle of the seat is large. By this means, it is possible to receive the passenger when the airbag is optimally deployed.

SUMMARY OF THE INVENTION

An aspect of the present invention provides an airbag apparatus including: an airbag disposed in a movable member and configured to be able to deploy in different sizes in a front-to-back direction of an automobile, the movable member being able to move in the front-to-back direction in front of a passenger in the automobile; and an airbag controller configured to control a size of the airbag to be deployed, depending on a position to which the movable member is moved.

DETAILED DESCRIPTION

Hereinafter, examples of the present invention will be described with reference to the accompanying drawings.

The apparatus disclosed in JP-A No. H08-000520 controls the timing at which the airbag is actuated, but cannot precisely control the deployment state of the airbag. Therefore, it is difficult to reliably receive the passenger when, for example, the automobile is braked and turned and the passenger is largely moved. In addition, it is difficult to accurately calculate the distance between the airbag and the passenger based on the tilt angle of the driver's seat, and therefore difficult to precisely control the deployment state of the airbag.

It is desirable to provide an airbag apparatus including airbag capable of reliably receiving a passenger.

Example 1

Figure 1:
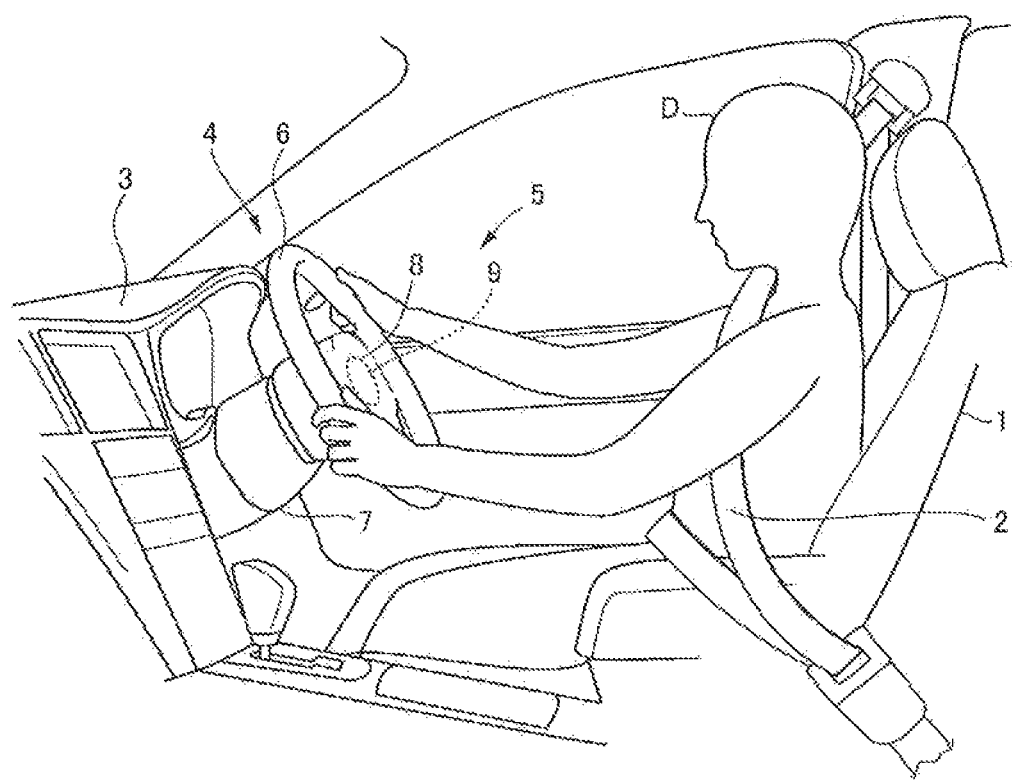
FIG. 1 illustrates a configuration of an automobile including an airbag apparatus according to Example 1 of the present invention.

FIG. 1 illustrates a configuration of an automobile including an airbag apparatus according to Example 1 of the present invention. This automobile is configured to be able to switch between automatic driving and manual driving, and includes a driver's seat 1, a seat belt 2 disposed on the driver's seat 1, an instrument panel 3 disposed in front of the driver's seat 1, a steering 4 disposed between the driver's seat 1 and the instrument panel 3, and an airbag apparatus 5 disposed in the steering 4.

The seat belt 2 is configured to fix the shoulder and the waist of a passenger D sitting on the driver's seat 1, which is so called a three point seat belt. The instrument panel 3 extends in the front part of a vehicle compartment in the width direction of the automobile, and is provided with various in-car equipment, such as a switch for switching between the automatic driving and the manual driving. Here, the automatic driving means not only completely automated driving, but also driving with a driving support system that partially supports the driving of the passenger D in the automobile.

The steering 4 includes a steering wheel 6 gripped by the passenger D to steer the automobile, and a shaft 7 extends from the steering wheel 6 into the instrument panel 3. The steering wheel 6 is disposed in front of the passenger D. During the automatic driving, the steering wheel 6 is moved forward from the position for the manual driving and stored. That is, the steering wheel 6 is formed to be able to move in the front-to-back direction. The shaft 7 is configured to transmit the amount of turning of the steering wheel 6 to tires of the automobile.

The airbag apparatus 5 includes a storage 8 disposed in a middle part of the steering wheel 6, and an airbag 9 stored in the storage 8. The airbag 9 is formed to be able to deploy in different sizes in the front-to-back direction of the automobile.

Figure 2:
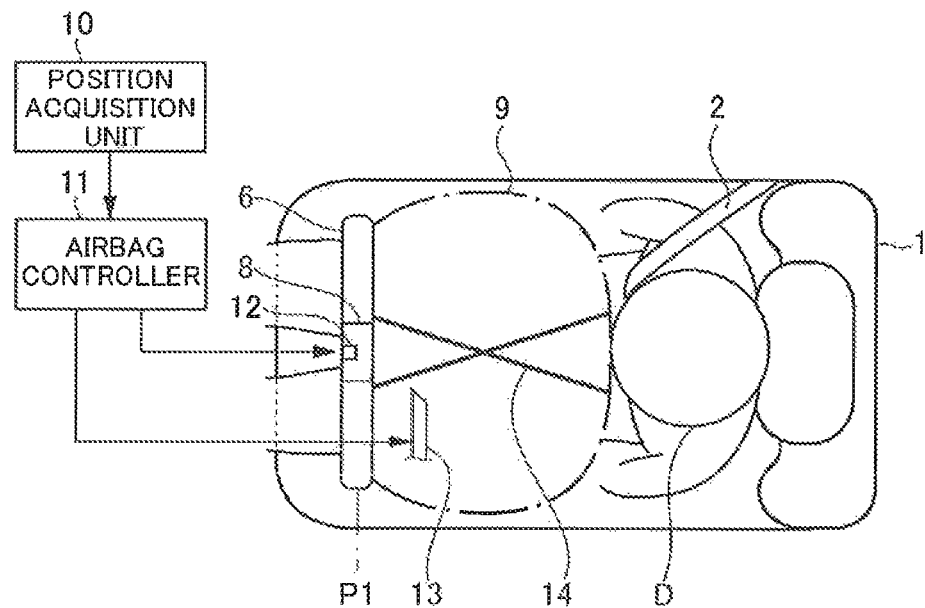
FIG. 2 illustrates a configuration of the airbag apparatus.

Next, the configurations of the airbag apparatus 5 will be described in detail. As illustrated in FIG. 2, the airbag apparatus 5 includes a position acquisition unit 10 and an airbag controller 11 coupled to the position acquisition unit 10. In addition, the airbag controller 11 is coupled to an inflator 12 and a tether cutter 13. Moreover, an internal tether 14 is disposed inside the airbag 9.

The inflator 12 is configured to deploy the airbag 9 and disposed in the storage 8. The internal tether 14 is disposed in the airbag 9 to extend in the front-to-back direction. The front end of the internal tether 14 is fixed to the front part side of the airbag 9, and the back end of the internal tether 14 is fixed to the back part side of the airbag 9. By this means, the internal tether 14 restricts the size of the airbag 9 deploying in the front-to-back direction, and allows the airbag 9 to deploy in a size smaller than a predetermined size. The tether cutter 13 is configured to cut the internal tether 14. By cutting the internal tether 14, the airbag 6 is deployed in the predetermined size in the front-to-back direction.

Figure 3:
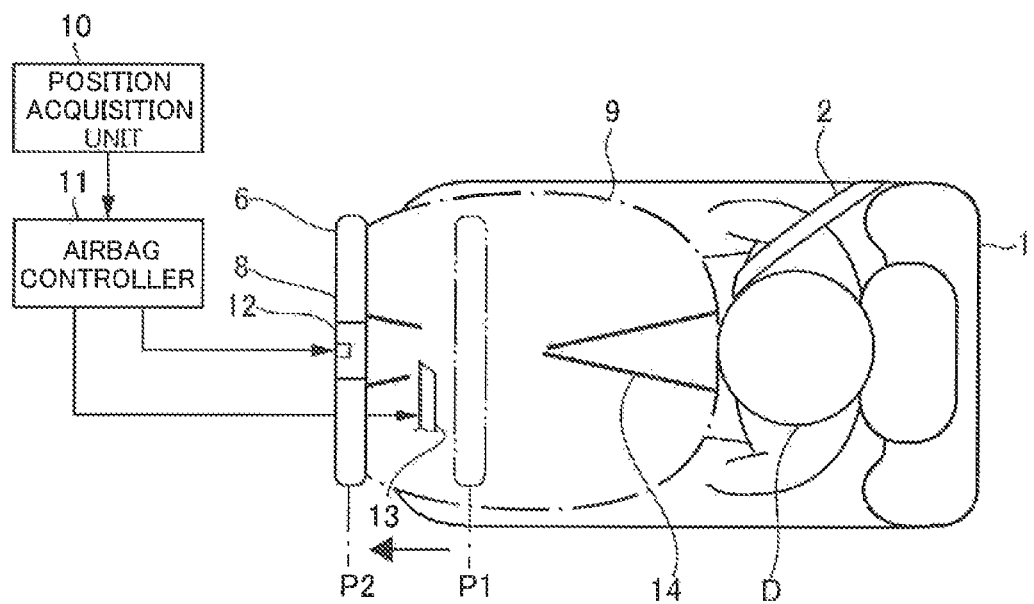
FIG. 3 illustrates control of the size of the airbag to be deployed depending on the position of a steering wheel.

The position acquisition unit 10 is configured to acquire the position to which the steering wheel 6 is moved in the front-to-back direction. The position acquisition unit 10 may directly detect the position to which the steering wheel 6 is moved. Alternatively, the position acquisition unit 10 may calculate the position to which the steering wheel 6 is moved, based on control information from a driving controller (not illustrated) that controls the driving of the automobile. The airbag controller 11 controls the size of the airbag 9 to be deployed depending on the position to which the steering wheel 6 is moved, which is acquired by the position acquisition unit 10. To be more specific, the airbag controller 11 controls the tether cutter 13 to deploy the airbag 9 in two sizes. That is, when the steering wheel 6 is located in a manual driving position P1 near the passenger D, the airbag controller 11 does not activate the tether cutter 13 to deploy the airbag 9 in the size smaller than the predetermined size. On the other hand, as illustrated in FIG. 3, when the steering wheel 6 is located in an automatic driving position P2 far from the passenger D, the airbag controller 11 activates the tether cutter 13 to cut the internal tether 14, so that the airbag 9 is deployed in the predetermined size in the front-to-back direction.

Next, operations of Example 1 will be described. First, as illustrated in FIG. 1, the passenger D sitting on the driver's seat 1 steers the steering wheel 6 to manually drive the automobile. In this case, the steering wheel 6 is fixed in the manual driving position P1 near the passenger D.

Here, when the automobile is in a collision, an impact on the automobile is inputted to a collision detector (not illustrated), and a collision signal from the collision detector is inputted to the airbag controller 11 illustrated in FIG. 2. Upon receiving the collision signal, the airbag controller 11 acquires information on the position to which the steering wheel 6 is moved, via the position acquisition unit 10. Then, the airbag controller 11 determines that the distance between the steering wheel 6 and the passenger D is short, based on the information indicating that the steering wheel 6 is located in the manual driving position P1, and injects deployment gas from the inflator 12 into the airbag 9 to deploy the airbag 9 without activating the tether cutter 13.

The size of the airbag 9 is restricted by the internal tether 14 in the front-to-back direction. The airbag 9 with the internal tether 14 is deployed in the size smaller than the predetermined size without the internal tether 14. Here, the length of the internal tether 14 is adjusted in advance so as to allow the airbag 9 to receive the passenger D in an optimum position, based on the distance between the manual driving position P1 of the steering wheel 6 and the driver's seat 1. Therefore, the airbag 9 restricted by the internal tether 14 is deployed in a size corresponding to the distance between the manual driving position P1 and the passenger D, and receives the passenger D. By this means, the airbag 9 can reliably absorb the impact on the passenger D in the collision.

On the other hand, when the driving mode is switched from the manual driving to the automatic driving, the steering wheel 6 is moved to the automatic driving position P2 far from the passenger D. By this means, it is possible to prevent incorrect operation by the passenger D. When the automobile is in a collision during the automatic driving, a collision signal from the collision detector is inputted to the airbag controller 11 in the same way as the manual driving.

Upon receiving the collision signal, the airbag controller 11 acquires information on the position to which the steering wheel 6 is moved, via the position acquisition unit 10 as illustrated in FIG. 3. Then, the airbag controller 11 determines that the distance between the steering wheel 6 and the passenger D is long, based on the information indicating that the steering wheel 6 is located in the automatic driving position P2, activates the tether cutter 13 to cut the internal tether 14, and injects the deployment gas from the inflator 12 into the airbag 9 to deploy the airbag 9.

In this case, the airbag 9 is not restricted by the internal tether 14, and therefore is deployed in the predetermined size. Here, the size of the airbag 9 in the front-to-back direction is adjusted in advance based on the distance between the automatic driving position P2 of the steering wheel 6 and the driver's seat 1, so as to allow the airbag 9 to receive the passenger D in the optimum position. Therefore, the airbag 9 is deployed in a size corresponding to the distance between the automatic driving position P2 and the passenger D, and receives the passenger D. By this means, the airbag 9 can reliably absorb the impact on the passenger D in the collision.

As described above, the airbag 9 is deployed in the size corresponding to the distance between the steering wheel 6 and the passenger D, and therefore can receive the passenger D in the optimum position, and acquire a reaction force to receive the passenger D from, for example, the steering wheel 6. In particular, during the automatic driving, the passenger D does not hold the steering wheel 6, and therefore may be rapidly moved in the collision. Even in this case, the airbag 9 can receive the passenger D in an appropriate position, and therefore it is possible to significantly reduce the impact on the passenger D in the collision.

With the present example, the airbag controller 11 controls the size of the airbag 9 to be deployed, depending on the distance between the steering wheel 6 and the passenger D. Therefore, the airbag 9 can reliably receive the passenger D even when the distance between the steering wheel 6 and the passenger is greatly changed.

Example 2

With Example 1, when the motion of the automobile is greater than a predetermined value, the airbag controller 11 preferably controls the size of the airbag 9 to be deployed, depending on the position to which the steering wheel 6 is moved and the magnitude of the motion of the automobile.

Figure 4:
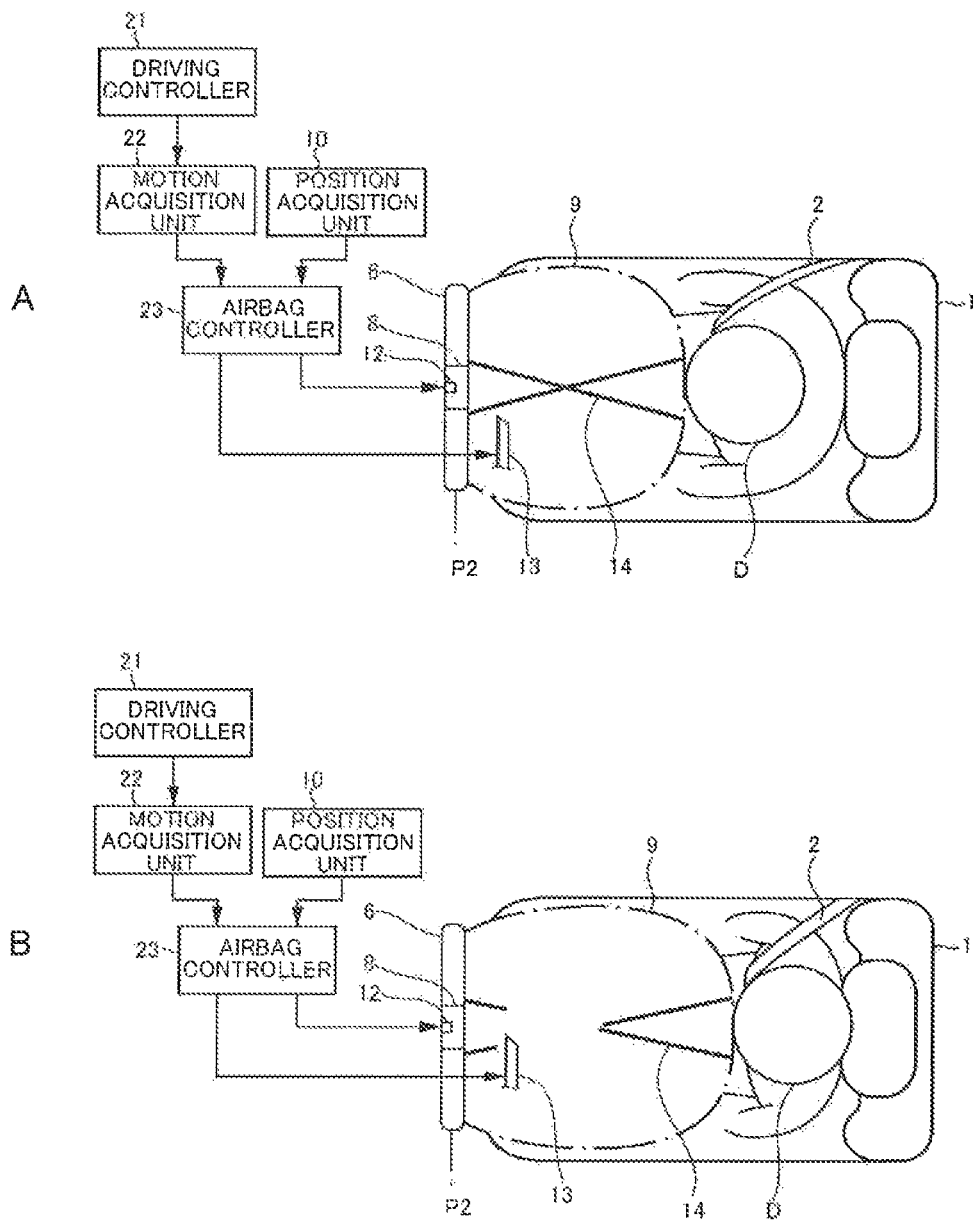
FIG. 4 illustrates a configuration of the airbag apparatus according to Example 2.

For example, the configuration as illustrated in FIG. 4A may be applied to Example 1. Here, a motion acquisition unit 22 coupled to the driving controller 21 of the automobile is additionally provided, and an airbag controller 23 coupled to the motion acquisition unit 22 may be provided instead of the airbag controller 11. The driving controller 21 is configured to control the automatic driving of the automobile, based on map data stored in advance and the present position of the automobile. The driving controller 21 controls, for example, braking and turning of the automobile.

The motion acquisition unit 22 is configured to acquire the motion of the automobile based on control information from the driving controller 21. For example, the motion acquisition unit 22 may acquire the amount of braking and the amount of turning of the automobile based on control information from the driving controller 21. In addition, the motion acquisition unit 22 may detect the motion of the passenger D on the driver's seat 1, and acquire the motion of the automobile based on the motion of the passenger D. When the amount of braking and the amount of turning of the automobile, which are acquired by the motion acquisition unit 22, are greater than predetermined values, the airbag controller 23 controls the size of airbag 9 to be deployed, depending on the position to which the steering wheel 6 is moved and the magnitude of the motion of the automobile.

First, when the automobile is in a collision while the steering wheel 6 is fixed in the manual driving position P1 during the manual driving, the airbag controller 23 deploys the airbag 9 without activating the tether cutter 13 in the same way as Example 1.

On the other hand, when the automobile is in a collision while the steering wheel 6 is fixed in the automatic driving position P2 during the automatic driving, the airbag controller 23 acquires the position to which the steering wheel 6 is moved via the position acquisition unit 10, and also acquires the amount of braking and the amount of turning of the automobile via the motion acquisition unit 22. In this case, when the amount of braking and the amount of turning of the automobile are equal to or smaller than the predetermined values, the airbag controller 23 deploys the airbag 9 without activating the tether cutter 13 as illustrated in FIG. 4A. As described above, when the amount of braking and the amount of turning of the automobile are small during the automatic driving, the airbag 9 deployed in the size which is the same as that of the manual driving can reliably receive the passenger D.

Meanwhile, when the amount of braking and the amount of turning of the automobile are greater than the predetermined values, for example, when the braking and the steering are performed at the same time during the automatic driving, the airbag controller 23 activates the tether cutter 13 to cut the internal tether 14 and deploys the airbag 9 as illustrated in FIG. 4B. Here, during the manual driving by the passenger D, it is difficult to perform the braking and the steering with the maximum automobile performance. Meanwhile, during the automatic driving by the driving controller 21, it is possible to perform the braking and the steering with the maximum automobile performance. Therefore, during the automatic driving, the motion of the automobile may be greater than that of the manual driving, and accordingly, the acceleration of the movement of the passenger D due to a collision may be increased.

Therefore, the size of the airbag 9 in the front-to-back direction is adjusted to receive the passenger D in the optimum position, based on the distance between the automatic driving position P2 of the steering wheel 6 and the driver's seat 1, and the acceleration of the movement of the passenger D when the amount of braking and the amount of turning of the automobile are greater than the predetermined values. By this means, the airbag 9 is deployed in the size corresponding to the distance between the automatic driving position P2 and the passenger D and the acceleration of the movement of the passenger D to receive the passenger D. As a result, the airbag 9 can reliably absorb the impact on the passenger D moving at a high acceleration in a collision during the automatic driving.

Here, the control of the airbag controller 23 is not limited to during the automatic driving, as long as the airbag controller 23 controls the size of the airbag 9 to be deployed depending on the position to which the steering wheel 6 is moved and the magnitude of the motion of the automobile, when the motion of the automobile acquired by the motion acquisition unit 22 is greater than the predetermined value. For example, when the motion of the automobile is greater than the predetermined value during the manual driving, the airbag controller 23 may deploy the airbag 9 in a size depending on the distance between the manual driving position P1 of the steering wheel 6 and the passenger D and the acceleration of the movement of the passenger D. In this case, by adjusting the length of the internal tether 14 based on the distance between the manual driving position P1 and the passenger D, and the acceleration of the movement of the passenger D when the motion of the automobile is greater than the predetermined value, it is possible to deploy the airbag 9 in the optimum size, and therefore to reliably receive the passenger D.

With the present example, the size of the airbag 9 to be deployed is controlled depending on the position to which the steering wheel 6 is moved and the magnitude of the motion of the automobile, when the motion of the automobile acquired by the motion acquisition unit 22 is greater than the predetermined value. Therefore, it is possible to reliably absorb the impact on the passenger D moving at a high acceleration in a collision.

Example 3

Figure 5:
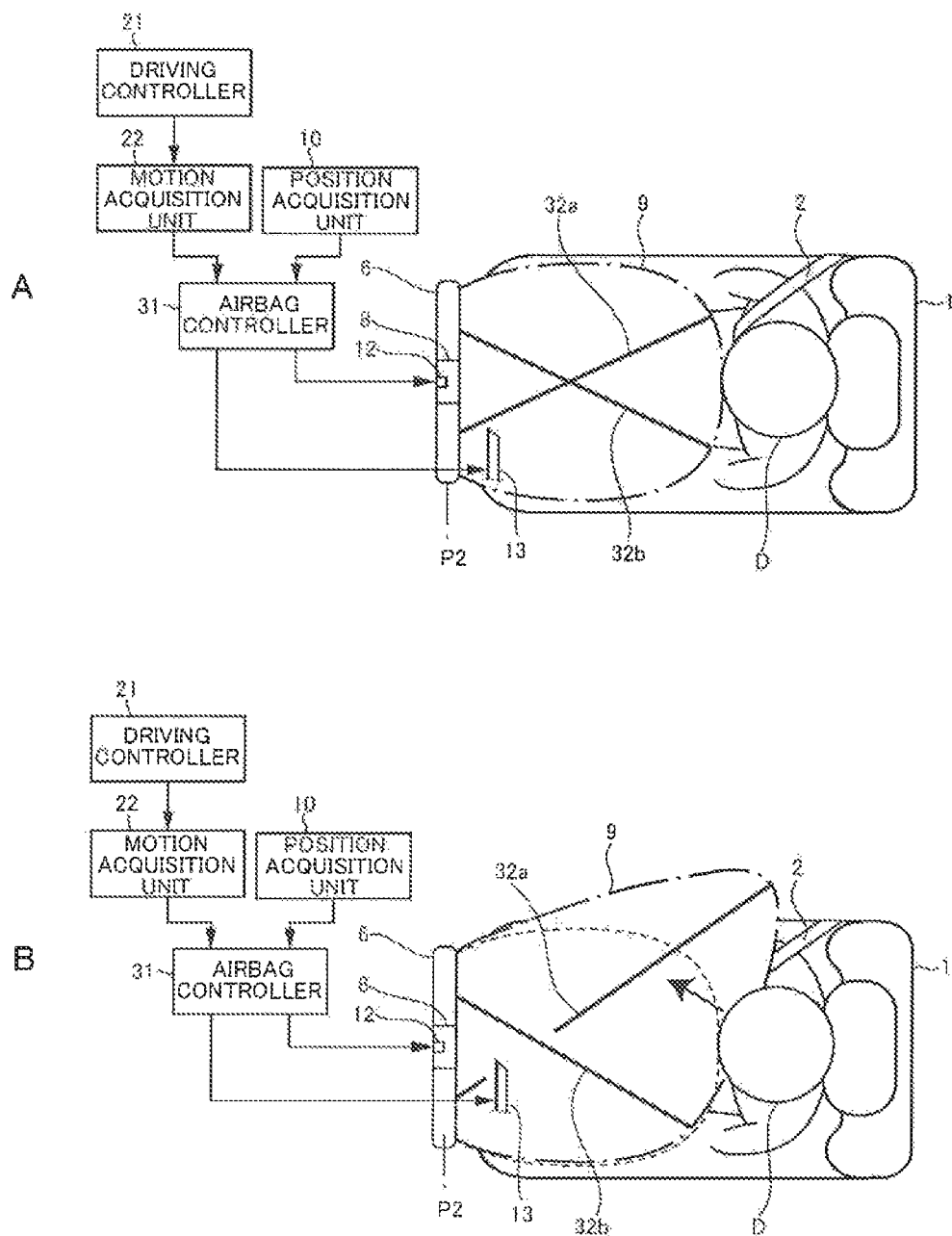
FIG. 5 illustrates a configuration of the airbag apparatus according to Example 3.

With Example 2, the airbag controller 23 controls the size of the airbag 9 to be deployed when the motion of the automobile is greater than the predetermined value. However, this is by no means limiting as long as the airbag controller 23 can control the size of the airbag 9 to be deployed depending on the position to which the steering wheel 6 is moved and the motion of the automobile. For example, the configuration as illustrated in FIG. 5A may be applied to Example 2. Here, an airbag controller 31 may be provided instead of the airbag controller 23, and internal tethers 32a and 32b may be provided instead of the internal tether 14.

The internal tethers 32a and 32b are disposed in the airbag 9 to restrict the size of the airbag 9 in the front-to-back direction and also in the right and left direction (the width direction of the automobile). That is, the internal tethers 32a and 32b are disposed to allow the airbag 9 to deploy in a size smaller than a predetermined size in the front-to-back direction and the right and left direction. Here, the internal tether 32a restricts the size of the airbag 9 in the right direction, and the internal tether 32b restricts the size of the airbag 9 in the left direction. The airbag controller 31 is configured to control the size of the airbag 9 to be deployed in the right and left direction, depending on the motion of the automobile in the right and left direction, which is acquired by the motion acquisition unit 22.

For example, during the automatic driving, when the automobile turning in the left direction is in a collision, the airbag controller 31 acquires the position to which the steering wheel 6 is moved via the position acquisition unit 10, and also acquires the amount of turning of the automobile via the motion acquisition unit 22. Then, the airbag controller 31 calculates the direction of the movement of the passenger D as the right direction, based on the amount of turning inputted from the motion acquisition unit 22. Then, the airbag controller 31 activates the tether cutter 13 to cut only the internal tether 32a, so as to deploy the airbag 9 in the right direction.

By this means, the airbag 9 is deployed in the right direction corresponding to the direction of the movement of the passenger D, and therefore can receive the passenger D. Meanwhile, when the automobile turns in the right direction, the airbag controller 31 cuts the internal tether 32b to allow the airbag 9 to deploy in the left direction, so that the airbag 9 can receive the passenger D. As described above, the airbag controller 31 controls the size of the airbag 9 to be deployed in the right and left direction, depending on the position to which the steering wheel 6 is moved and the motion of the automobile in the right and left direction, which is acquired by the motion acquisition unit 22. By this means, the airbag 9 can reliably receive the passenger D.

Here, the passenger D is held by the three point seat belt 2. Therefore, when the automobile turns in the right direction, the acceleration of the movement of the passenger D is higher than when the automobile turns in the left direction, because the seat belt 2 does not hold the left shoulder of the passenger D. Accordingly, it is preferred that the size of the airbag 9 to be deployed in the right direction and the left direction is adjusted depending on the direction in which the automobile turns.

Here, the direction of the deployment of the airbag 9 is not limited to the right and left direction. For example, the airbag 9 may be formed to be able to deploy in different two sizes in the direction intersecting with the front-to-back direction (hereinafter "intersecting direction") of the automobile, such as the up-to-down direction. By this means, the airbag controller 31 can control the size of the airbag 9 to be deployed in the intersecting direction depending on the motion of the automobile in the intersecting direction which is acquired by the motion acquisition unit 22.

With the present example, the airbag controller 31 controls the size of the airbag 9 to be deployed in the intersecting direction, depending on the motion of the automobile in the intersecting direction which is acquired by the motion acquisition unit 22. Therefore, it is possible to more reliably receive the passenger D.

Here, with Examples 1 to 3, the airbag 9 is formed to be able to deploy in two different sizes in the front-to-back direction. However, the size is not limited to the two sizes as long as the airbag 9 can be deployed in a plurality of different sizes in the front-to-back direction.

For example, with Example 2, the airbag 9 may be formed to be able to deploy in four different sizes in the front-to-back direction corresponding to the following situations: 1) the motion of the automobile is equal to or smaller than the predetermined value during the manual driving; 2) the motion of the automobile is greater than the predetermined value during the manual driving; 3) the motion of the automobile is equal to or smaller than the predetermined value during the automatic driving; and 4) the motion of the automobile is greater than the predetermined value during the automatic driving. In addition, with Example 3, the airbag 9 may be formed to be able to deploy in a plurality of different sizes in the intersecting direction to accept a plurality of different motions of the automobile in the intersecting direction.

Moreover, with Examples 1 to 3, the airbag 9 is formed to be deployed in front of the steering wheel 6. However, this is by no means limiting as long as the airbag 9 can be deployed toward the passenger D sitting on the driver's seat 1. For example, when the steering wheel 6 turning up is stored during the automatic driving, it is preferred that a tether is disposed in the front part of the airbag 9 so as to deploy the airbag 9 toward the driver's seat 1 side.

Figure 6:
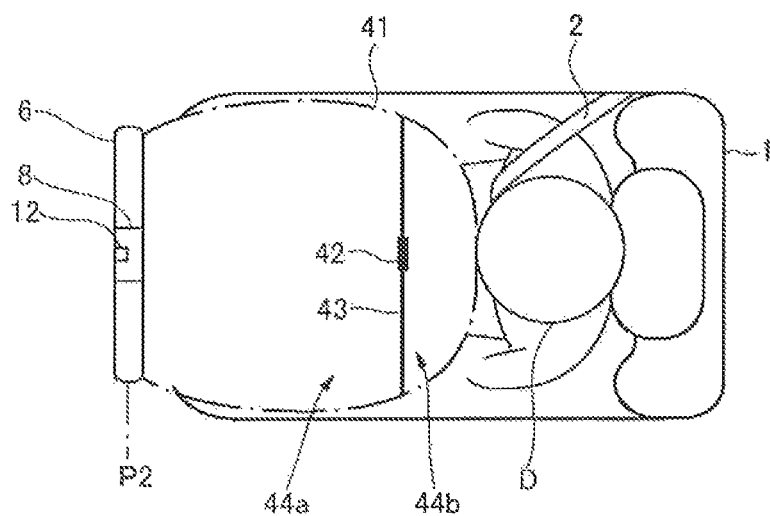
FIG. 6 illustrates primary parts of the airbag apparatus according to a modification of Examples 1 to 3.

Moreover, with Examples 1 to 3, the airbag 9 is formed to be able to deploy in different sizes by disposing the internal tether(s). However, this is by no means limiting as long as the airbag 9 is formed to be able to deploy in different sizes in the front-to-back direction. For example, a configuration as illustrated in FIG. 6 may be applied to Example 1. Here, an airbag 41 may be provided instead of the airbag 9, and a pressure value 42 may be provided instead of the internal tether 14.

The airbag 41 is divided into two deployment chambers 44a and 44b by a partition 43. A pressure valve 42 is disposed in the partition 43, and formed to allow the deployment gas to flow into the deployment chamber 44b when the deployment gas is injected from the inflator 12 into the deployment chamber 44a of the airbag 41 at a pressure equal to or higher than a predetermined value. Therefore, by adjusting the pressure of the deployment gas injected from the inflator 12 into the airbag 41, it is possible to deploy the airbag 41 in different sizes in the front-to-back direction.

Furthermore, with Examples 1 to 3, the tether cutter 13 is limited to one which mechanically cuts the internal tether(s). For example, the tether cutter 13 is not a cutter but a fragile portion of the internal tether which is cut by applying a predetermined pressure. By this means, the airbag controller controls the pressure in the airbag 9, and therefore the internal tether is cut at the fragile portion, so that it is possible to change the size of the airbag 9 to be deployed.

Furthermore, with Examples 1 to 3, the airbag 9 is disposed in the steering wheel 6, but this is by no means limiting as long as the airbag 9 is disposed in a movable member which can move in the front-to-back direction in front of the passenger D.

The invention claimed is:

1. An airbag apparatus comprising:
   an airbag disposed in a movable member and configured to be able to deploy in different sizes in a front-to-back direction of an automobile, the movable member being able to move in the front-to-back direction in front of a passenger in the automobile; and
   an airbag controller configured to control a size of the airbag to be deployed, depending on a position to which the movable member is moved,
   a motion acquisition unit configured to acquire a motion of the automobile, and wherein the airbag controller controls the size of the airbag to be deployed, depending on the position to which the movable member is moved and the motion of the automobile acquired by the motion acquisition unit; and
   wherein:
   the motion acquisition unit acquires an amount of turning of the automobile; and
   the airbag controller controls the size of the airbag to be deployed depending on the amount of turning, when the amount of turning acquired by the motion acquisition unit is greater than a predetermined value.

2. The airbag apparatus according to claim 1, wherein the movable member is a steering to steer the automobile.

3. The airbag apparatus according to claim 1, wherein:
   the airbag is formed to be able to deploy in different sizes in a direction intersecting with the front-to-back direction of the automobile; and
   the airbag controller controls the size of the airbag to be deployed in the intersecting direction, depending on the motion of the automobile in the intersecting direction which is acquired by the motion acquisition unit.

4. The airbag apparatus according to claim 2, wherein:
the airbag is formed to be able to deploy in different sizes in a direction intersecting with the front-to-back direction of the automobile; and
the airbag controller controls the size of the airbag to be deployed in the intersecting direction, depending on the motion of the automobile in the intersecting direction which is acquired by the motion acquisition unit.

5. The airbag apparatus according to claim 1, further comprising:
a tether disposed for the airbag and configured to restrict the size of the airbag to be deployed; and
a tether cutter configured to cut the tether,
wherein the airbag controller controls the tether cutter to deploy the airbag in different sizes.

6. The airbag apparatus according to claim 2, further comprising:
a tether disposed for the airbag and configured to restrict the size of the airbag to be deployed; and
a tether cutter configured to cut the tether,
wherein the airbag controller controls the tether cutter to deploy the airbag in different sizes.

7. The airbag apparatus according to claim 1, wherein the movable member is adjustable between a more forward position and a less forward position relative to the front-to-back direction of the automobile, and wherein the airbag controller controls the size of the airbag to be deployed depending on the motion of the automobile acquired by the motion acquisition unit when the movable member is in the more forward position and not when in the less forward position.

8. The airbag apparatus according to claim 2, wherein the steering wheel is adjustable between a more forward position and a less forward position relative to the front-to-back direction of the automobile, and wherein the airbag controller controls the size of the airbag to be deployed depending on the motion of the automobile acquired by the motion acquisition unit when the steering wheel is in the more forward position and not when in the less forward position.

9. The airbag apparatus according to claim 1 wherein:
the motion acquisition unit acquires both an amount of turning and an amount of braking of the automobile; and
the airbag controller controls the size of the airbag to be deployed depending on the amount of turning and the amount of braking, when the amount of turning and the amount of braking acquired by the motion acquisition unit is greater than predetermined values.

10. The airbag apparatus according to claim 2 wherein:
the motion acquisition unit acquires both an amount of turning and an amount of braking of the automobile; and
the airbag controller controls the size of the airbag to be deployed depending on the amount of turning and the amount of braking, when the amount of turning and the amount of braking acquired by the motion acquisition unit is greater than predetermined values.

11. The airbag apparatus according to claim 1 wherein the movable member is adjustable between a more forward position and a less forward position relative to the front-to-back direction of the automobile, and wherein the airbag controller determines an amount of expansion of the airbag in the front-to-back direction of the automobile based on criteria a) to d): wherein in a) the motion of the automobile is equal to or smaller than the predetermined value during a time when the movable member is in a less forward position; b) the motion of the automobile is greater than the predetermined value when the movable member is in a less forward position; c) the motion of the automobile is equal to or smaller than the predetermined value when the movable member is in a more forward position; and d) the motion of the automobile is greater than the predetermined value when the movable member is in a less forward position.

12. The airbag apparatus according to claim 2 wherein the steering wheel is adjustable between a more forward position and a less forward position relative to the front-to-back direction of the automobile, and wherein the airbag controller determines an amount of expansion of the airbag in the front-to-back direction of the automobile based on criteria a) to d): wherein in a) the motion of the automobile is equal to or smaller than the predetermined value during a time when the steering wheel is in a less forward position; b) the motion of the automobile is greater than the predetermined value when the steering wheel is in a less forward position; c) the motion of the automobile is equal to or smaller than the predetermined value when the steering wheel is in a more forward position; and d) the motion of the automobile is greater than the predetermined value when the steering wheel is in a less forward position.

13. The apparatus according to claim 1, wherein the movable member is adjustable between a more forward position and a less forward position relative to the front-to-back direction of the automobile, and wherein the airbag controller adjusts the airbag size between a more expansive size airbag and a less expansive size airbag, and wherein the airbag controller adopts the less expansive size airbag when the movable member is in the more forward position and the motion of the automobile acquired by the motion acquisition unit is below a threshold value.

14. The apparatus according to claim 2, wherein the steering wheel is adjustable between a more forward position and a less forward position relative to the front-to-back direction of the automobile, and wherein the airbag controller adjusts the airbag size between a more expansive size airbag and a less expansive size airbag, and wherein the airbag controller adopts the less expansive size airbag when the steering wheel is in the more forward position and the motion of the automobile acquired by the motion acquisition unit is below a threshold value.

15. The apparatus according to claim 1, wherein the movable member is adjustable between a more forward position and a less forward position relative to the front-to-back direction of the automobile, and wherein the airbag controller controls the size of the airbag to be deployed depending on a combination of an amount of acceleration of the passenger toward the front of the automobile determined by the motion acquisition unit and whether the movable member is in the more forward position or the less forward position.

16. The apparatus according to claim 15, wherein the airbag controller adopts a less expansive size in the airbag when the movable member is in the more forward position and the acceleration of the passenger acquired by the motion acquisition unit is below a threshold value.

17. The apparatus according to claim 2, wherein the steering wheel is adjustable between a more forward position and a less forward position relative to the front-to-back direction of the automobile, and wherein the airbag controller controls the size of the airbag to be deployed depending on a combination of an amount of acceleration of the passenger toward the front of the automobile determined by the motion acquisition unit and whether the steering wheel is in the more forward position or the less forward position, and wherein the airbag controller adopts a less expansive size in the airbag when the steering wheel is in the more forward position and the acceleration of the passenger acquired by the motion acquisition unit is below a threshold value.

18. The apparatus according to claim 1, wherein the movable member is a steering wheel which includes a housing receiving the airbag, and wherein the airbag includes one of a valve or tether for expansion control by the airbag controller.

\* \* \* \* \*